Oct. 16, 1962   E. J. PORKKA   3,058,715
ADJUSTABLE STOOL
Filed April 27, 1959
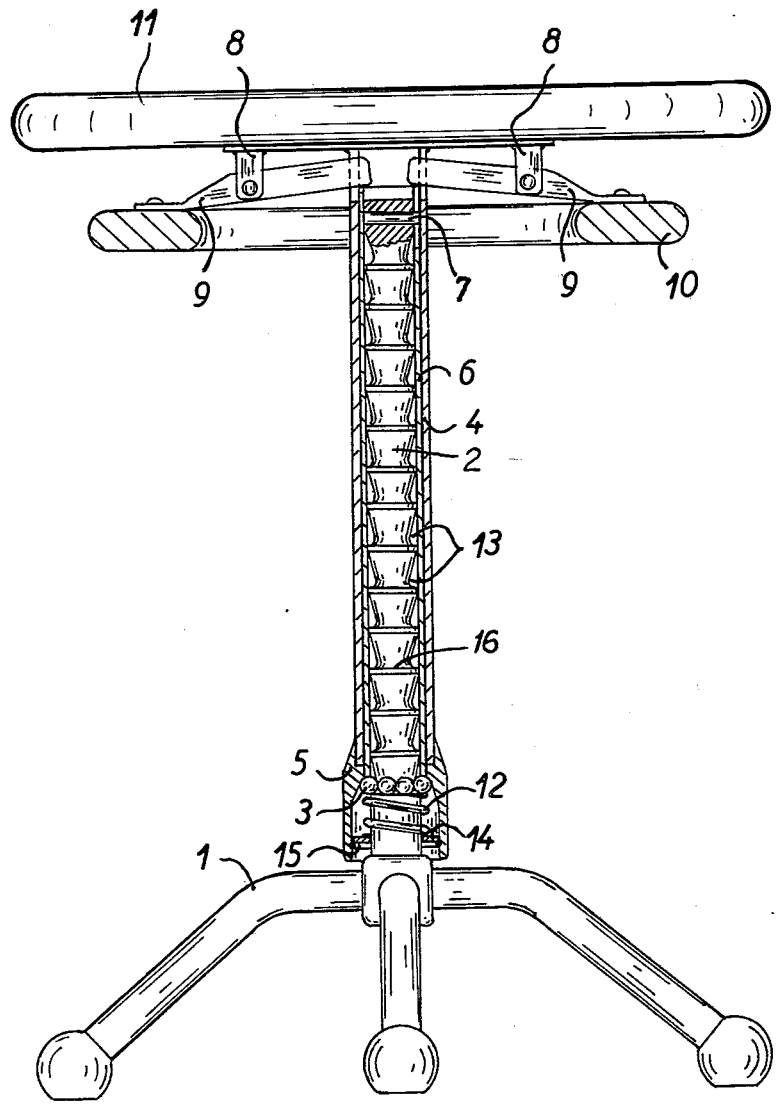

United States Patent Office 3,058,715
Patented Oct. 16, 1962

3,058,715
ADJUSTABLE STOOL
Eero J. Porkka, Ravattula, Abo, Finland
Filed Apr. 27, 1959, Ser. No. 809,038
3 Claims. (Cl. 248—409)

The present invention relates to stools, especially stools intended for use in offices and similar workrooms, particularly for typewriting.

A disadvantage of the hitherto known stools consists in that it is a rather heavy, tiresome or complicated operation to alter the height of the stools. Some known stools also have the draw-back that their mechanism for changing the height does not guarantee that the set or wanted height is maintained satisfactorily and with security.

The main object of the present invention is to provide a new and useful stool having means for changing the height of the stool, which means are easy, rapid and accurate to operate and also capable of keeping the set heights unchanged with complete certainty and accuracy.

This and other objects of the invention are attained through the feature that the stool comprises a pedestal with recesses engageable by balls which are accommodated in a space having generally a conical shape and being provided in a member bearing the weight of the seat and the loads thereon, whereby the balls are likely to be firmly retained in engagement with the said recesses thus locking the seat in the chosen height position.

According to other features of the present invention the balls are urged towards the apex of the conical form of the said space by a spring. However, the balls can be forced in the opposite direction by means of a manually operable member in order to allow adjustments of the height of the seat.

These and other features and objects of the invention will be apparent from the following description, reference being had to the accompanying drawing showing a suitable embodiment of the invention.

The reference character 1 indicates a base, foot or support of the stool, while 11 is the seat of the same. The support 1 bears a pedestal or a rod 2 which may be welded to the support and perhaps inserted with its lower end into a central, advantageously tapered recess of the support. The number of the individual feet of the base may be three or four, and the feet may extend radially from a central point.

The pedestal 2 is provided with circumferential parallel grooves 13 the depth of which is greatest at the lower part of the grooves providing bearing shoulders 16. Hard steel balls 3 are adapted to be brought into engagement with the said grooves 13. The balls 3 are accommodated in a ball race member 5 having an inner recess of a, generally, tapered form. The width of this tapered form of the recess is increasing in the direction downwards, the width at the lower end of member 5 being great enough to allow the balls 3 to get out of the actual groove 13 in order to make it possible to have the balls 3 to enter into another groove 13, when it is desired to alter the height of the chair.

A helical spring 12 inserted in the tapered recess is adapted to urge the balls towards the small end of the recess and thus to bring the balls into the selected or appropriate groove 13. The spring 12 is held by a washer 14 and a locking ring 15 inserted partly into a circumferential groove in the inner wall of member 5. The member 5 is fastened to a tube 4 supporting the seat 11 of the stool on its upper end. In telescopic relation to the tube 4 is an inner tube 6 arranged between tube 4 and the grooved pedestal 2. Preferably, the tube 6 is held against rotation by means of a pin 7 inserted firmly into a hole in the upper end portion of the pedestal 2 and extending into a longitudinal slot in the tube 6. The tube 6 serves the purpose of forcing the balls 3 out of their engagement with the actual groove of the pedestal 2 when the tube 6 is pressed downwardly relative to the outer tube 4, as the lower end of the tube 6 is situated close to the balls 3.

The means for exerting the necessary movements of the tube 6 consists of a ring 10 situated under the seat 11. The ring 10 has a number of levers 9 connected to it. The levers 9 are pivoted on brackets 8 fastened to the under side of the seat 11. By imparting a rising motion to the ring 10 the inner ends of its levers 9 are caused to press down the tube 6 in relation to the tube 4 as described above, whereby the height of the seat can be reset at will.

When the ring 10 is released the weight of the ring 10 and the strength of the spring 12 will cause the balls 3 to enter the new appropriate groove 13 corresponding to the new height of the seat.

In all height positions of the seat the balls are acting as carrying elements and also as a ball bearing so that the seat is readily rotatable no matter what the weight is upon the seat 11.

As will readily be seen I have invented a new and most useful and reliable chair especially adapted for working purposes.

It should be understood that the above embodiment is given only as an example and not in a limiting sense.

What I claim is:

1. An adjustable stool comprising a base having a fixed pedestal with a series of peripheral downwardly tapering grooves with lower bearing shoulders, a tubular member surrounding the pedestal, a seat on said tubular member, a downwardly flaring outer ball race member on the lower end of the tubular member, a series of bearing balls within the ball race member, a spring on the pedestal and within the outer race member bearing upwardly against the bearing balls to move them onto the bearing shoulder below a selected groove of the pedestal.

2. An adjustable stool comprising a base having a fixed pedestal with a series of peripheral downwardly tapering grooves with lower bearing shoulders, a tubular member surrounding the pedestal, a seat on said tubular member, a downwardly flaring outer ball race member on the lower end of the tubular member, a series of loose bearing balls, a spring on the pedestal and within the outer ball race member bearing upwardly against the bearing balls to move them onto the bearing shoulder below a selected groove of the pedestal, a second tube between the pedestal and the tubular member, and means carried by the seat for depressing the second tube and separating the bearing balls from lodgment on said shoulder.

3. An adjustable stool comprising a base having a fixed pedestal with a series of peripheral downwardly tapering grooves with lower bearing shoulders, a vertically adjustable tubular member surrounding the pedestal, a seat on said tubular member, a downwardly flaring outer ball race member on the lower end of the tubular member, a series of loose bearing balls within the ball race member, a spring on the pedestal and within the outer ball race member bearing upwardly against the bearing balls to move them onto the bearing shoulder below a selected groove of the pedestal, a second tube between the pedestal and the tubular member, diametrically opposed brackets depending from the seat, levers pivoted on the brackets and an operating ring attached to the outer ends of the levers, said levers being connected to the said second tube and dislodging the balls from said groove for depressing the last named tube.

References Cited in the file of this patent

UNITED STATES PATENTS

| | | |
|---|---|---|
| 77,676 | Swett | May 5, 1868 |
| 478,840 | Biggs et al. | July 12, 1892 |
| 489,172 | Wilcox | Jan. 3, 1893 |
| 581,136 | Preece | Apr. 20, 1897 |
| 720,549 | Adler | Feb. 17, 1903 |
| 1,194,551 | Schossler | Aug. 15, 1916 |
| 1,344,092 | Shaw | June 22, 1920 |
| 2,388,056 | Hendricks | Oct. 30, 1945 |
| 2,529,861 | Angell et al. | Nov. 14, 1950 |
| 2,638,969 | Restivo | May 19, 1953 |
| 2,711,209 | Riabovel | June 21, 1955 |